United States Patent [19]
Attix

[11] Patent Number: 5,095,217
[45] Date of Patent: Mar. 10, 1992

[54] WELL-TYPE IONIZATION CHAMBER RADIATION DETECTOR FOR CALIBRATION OF RADIOACTIVE SOURCES

[75] Inventor: Frank H. Attix, Madison, Wis.

[73] Assignee: Wisconsin Alumni Research Foundation, Madison, Wis.

[21] Appl. No.: 599,305

[22] Filed: Oct. 17, 1990

[51] Int. Cl.⁵ ............................................. G01T 1/185
[52] U.S. Cl. ............................. 250/374; 250/385.1; 250/491.1
[58] Field of Search ............... 250/374, 382, 383, 384, 250/385.1, 389, 491.1, 497.1, 328

[56] References Cited

U.S. PATENT DOCUMENTS

| | | |
|---|---|---|
| 2,824,252 | 2/1958 | Redman et al. |
| 2,953,702 | 9/1960 | Zieler |
| 3,317,823 | 5/1967 | Brodsky |
| 4,144,461 | 3/1979 | Glasser et al. |
| 4,253,024 | 2/1981 | Peschmann |
| 4,264,816 | 4/1981 | Walenta |
| 4,300,050 | 11/1981 | Hizo et al. |
| 4,420,689 | 12/1983 | Rogers et al. ............ 250/385.1 |
| 4,562,354 | 12/1985 | Keller et al. |
| 4,563,586 | 1/1986 | Jordan |
| 4,583,020 | 4/1986 | Cliquet et al. |
| 4,590,401 | 5/1986 | Goldstein et al. |
| 4,617,465 | 10/1986 | Yoshida |
| 4,622,466 | 11/1986 | Tamura |
| 4,633,089 | 12/1986 | Wijangco |
| 4,682,035 | 7/1987 | Shulman |
| 4,682,036 | 7/1987 | Wakayama et al. |
| 4,686,369 | 8/1987 | McDaniel et al. |
| 4,695,731 | 9/1987 | Larkin |
| 4,845,364 | 7/1989 | Alexander et al. |
| 4,956,557 | 9/1990 | Vlasbloem ............ 250/385.1 |

FOREIGN PATENT DOCUMENTS

| | | | |
|---|---|---|---|
| 710402 | 10/1980 | U.S.S.R. ............ | 250/385.1 |
| 786688 | 2/1982 | U.S.S.R. ............ | 250/374 |

OTHER PUBLICATIONS

S. J. Goetsch, et al., "Calibration of ¹⁹²IR High-Dose-Rate Afterloading Systems," Wisconsin Medical Physics, University of Wisconsin Medical School, 1990.

Primary Examiner—Constantine Hannaher
Assistant Examiner—Edward J. Glick
Attorney, Agent, or Firm—Foley & Lardner

[57] ABSTRACT

An ionization chamber radiation detector includes an outer shell, an inner well electrically connected to the outer shell to define an ionization chamber sensitive volume between them, and an ionization electrode that extends upwardly from a base into the space between the side walls of the well and shell. The shell and the walls of the well are grounded while the ionization electrode, which is electrically insulated from the shell, has a high voltage applied thereto. A guard electrode at the same voltage prevents electrical leakage. A sample positioner includes a thin walled guide tube which extends from a top cap down to a spacing disc. The spacing disc has an outer periphery which closely matches the interior of the well so that when the positioner is inserted into the wall the guide tube will be held at a desired position, preferably at the central axis of the well. A radiation source sample in a catheter is inserted through an opening in the top cap into the thin walled guide tube and down to a desired position within the tube, which precisely locates the source at a position which is preferably on the central axis of the detector. Close spacing between the source and the ionization chamber results in relatively high ionization current, allowing the radiation level to be measured based on the ionization current rather accumulated charge, and minimizing the effect of ambient background radiation.

30 Claims, 4 Drawing Sheets

WELL-TYPE IONIZATION CHAMBER RADIATION DETECTOR FOR CALIBRATION OF RADIOACTIVE SOURCES

FIELD OF THE INVENTION

This invention pertains generally to the field of measurement of radioactive sources and particularly to ionization chambers which are used for measuring radioactive intensity and for calibrating sources of radioactivity.

BACKGROUND OF THE INVENTION

Ionization chambers ("ion chambers") were developed for measuring the strength of ionizing radiations such as x-rays and the radiation emitted by radioactive sources. Ion chambers are particularly useful for calibrating radiation sources to be used in radiotherapy--the treatment of cancer with radiation. One type of radiotherapy is known as "brachytherapy," in which one or more radioactive sources are inserted into the human body, either through body orifices or surgical procedures, to position them in or near a cancer tumor which may be thereby reduced or eliminated. Conventional brachytherapy involves some hazard to medical personnel due to radiation exposure incidental to the installation of the sources in the patient, and patient care during the several days' treatment duration.

The new brachytherapy technique of high-dose-rate remote afterloading eliminates that exposure by allowing personnel to install only non-radioactive plastic catheters. After medical personnel have moved out of the treatment room, a small but intensely radioactive gamma-ray source fastened to the end of a stiff wire is moved under computer control out of its lead shield and through the catheter (or sequentially through several catheters) to the desired treatment locations. The computer selects the exact source locations and dwell times within each catheter, according to the treatment program specified by the radiotherapist. The treatment duration is measured in minutes instead of days, because of the high source strength. The fact that only a single source is used, and that the delivery rate of dose (i.e., energy spent per unit mass of tissue) is high, makes imperative the accurate and reliable calibration of the source strength by means of a suitable chamber.

High dose rate remote afterloading brachytherapy devices, such as the Microselectron manufactured by the Nucletron Corporation, are being increasingly utilized in the United States. The most common radionuclide used in these devices is iridium 192 ($^{192}$Ir) in the form of a small pellet (e.g., 0.5 mm diameter 4 mm active length with 0.3 mm stainless steel wall) connected to a wire that pushes and pulls the pellet through a 2 mm outside diameter plastic catheter to guide the pellet to the desired locations. The initial activity of these sources is in the neighborhood of 10 curies (Ci), or $3.7 \times 10^{11}$ becquerels (Bq). The half-life of $^{192}$Ir is approximately 74 days, requiring relatively frequent (usually quarterly) source replacement to maintain short treatment times. These sources must be calibrated when they are placed into use. The supplier of the sources provides a calibration certificate which states an overall uncertainty in activity of plus or minus 10%; thus, an independent recalibration is preferably carried out after installation in an afterloading unit at a hospital or outpatient cancer treatment facility.

A rigorous procedure for carrying out such a calibration involves first sending a small (less than a few cubic centimeters) thimble-shaped ion chamber to the National Institute of Standards and Technology ("NIST," formerly known as the National Bureau of Standards) for calibration. Since NIST does not offer ion chamber calibrations for gamma rays having the spectrum of iridium-192, an interpolation between two adjacent calibration energies that are offered is utilized. This chamber is then positioned at one or more known distances 10-40 cm from the iridium source in the afterloading catheter. The observed ion currents are small (of the order of $10^{-11}$ amperes) hence difficult to measure accurately due to electrical insulator leakage and other perturbations. Other significant sources of error include scattered radiation from the room, inaccurate distance measurement, effects of size and shape of the ion chamber, irradiation of the chamber during transit time of the source to and from its assigned location, and air temperature and pressure. Such a calibration requires extreme care to obtain accuracy closer than 1-2%. It is a task for a well-trained expert radiation physicist, not a radiotherapy technician. Thus it should not be attempted by the smaller radiotherapy facilities not served by a physicist. Moreover it is an inefficient use of professional personnel to require that such a complicated, time-consuming and error-prone procedure be repeated on a routine basis four times a year, even where competent personnel are available.

Consequently there is a need for a compact, rugged and accurate device for conveniently and reproducibly calibrating the strength of a radioactive high-dose-rate source such as Ir-192 while positioned in its guiding catheter, after the source has been installed in a brachytherapy afterloading unit at a radiotherapy facility.

SUMMARY OF THE INVENTION

The ionization chamber radiation detector of the present invention is particularly suited to provide rapid, efficient, simple and accurate measurements of concentrated radiation sources such as those used in high dose rate brachytherapy afterloading systems. The device is capable of being utilized at clinical locations, with conventional electrometer and voltage supply equipment which is readily available and with minimal operator training. The device is particularly adapted to calibrate a radiation source of the type used in brachytherapy in which the source is contained in a catheter, with the device having an opening into an internal guide tube into which the catheter can be inserted by the operator and accurately positioned with little decision making required on the part of the operator. Thus, operator error is minimized and the repeatability of readings is enhanced from conventional calibration procedures.

The ionization chamber radiation detector of the present invention has an electrically conductive outer shell which surrounds a volume of air constituting the sensitive volume of the ionization chamber. This outer shell is grounded and contains a vent hole to maintain the internal air at ambient atmospheric pressure. An inner well formed of conductive metal is suspended within the outer shell and is electrically connected to it so that the well is also at ground potential. The sensitive volume of the ionization chamber is defined between the inner well and the outer shell. Within that volume is located an electrode that serves to collect the ions whose charge is conducted to the electrometer. That electrode will be referred to as the ionization electrode, which laterally surrounds the well and which is electrically insulated from both the well and the shell. A high voltage is applied to this electrode so that ionizing radiation, such as gamma rays, passing through the ionization chamber will ionize the air molecules within the ionization chamber sensitive volume, resulting in a current flowing between the grounded shell and well and the ionization electrode. The device preferably further includes a positioner for precisely positioning the radioisotope containing catheter in the center of the well to obtain uniform radiation to the ionization chamber and to insure reproducibility of readings.

The lateral or side walls of the shell, the inner well, and the electrode all are preferable cylindrical and concentric with one another. By avoiding sharp corners within the ionization chamber, the electric field within the ionization chamber is maintained substantially uniform so that the recombination of oppositely-charged ions, which causes a loss of ionization current, is minimized. The source is positioned close to the sensitive volume, typically within one to two centimeters, so that the ionizing radiation from the source far exceeds background ionizing radiation, thereby minimizing measurement errors due to radiation scattered from surrounding objects or structures.

Preferably, the catheter is precisely positioned in the well by the utilization of a positioner composed of a thin-walled guide tube which extends downwardly from a cap at the top to a positioning disc at the bottom end. The disc has an outer periphery which closely matches the inner periphery of the well. The positioner is inserted into the well with the positioning disc in sliding engagement with the walls of the well until the cap is fitted down onto the top of the outer shell. The cap has an opening in its top which leads into the interior of the thin-walled guide tube. The catheter guide tube thus is positioned to extend down the center of the cylindrical walled well so that there will be substantially no deviation of the lateral position of the catheter when it is inserted in the tube. Preferably, the guide tube includes an end stop at its bottom, or at some other intermediate position, such that the catheter containing the radiation source can be simply inserted into the tube and pushed down by the operator until the end of the catheter contacts the end stop. The radioactive source can then be driven through the catheter to the location, approximately halfway down the guide tube, that produces the maximum ionization current in the ion chamber.

The ionization current obtained from the ionization chamber device of the present invention is at a high enough level to allow accurate reading with conventional electrometer equipment and with the level of radiation being directly related to the current level. Thus, it is not necessary to integrate or accumulate the charge resulting from ionization current, as is the case in many conventional ionization chamber devices, thereby avoiding the inherent errors caused by such accumulation measurement techniques, including the error due to unwanted ionization charge produced while the source is approaching, but has not yet reached, its desired location. Instantaneous current measurement also results in substantial reduction in the time required to complete source calibrations.

The ionization electrode in this ion chamber is designed to eliminate the recombination of oppositely-charged ions in the sensitive volume when the conventionally-available 300 volt potential is applied. With a 10 Ci $^{192}$Ir source positioned in the ion chamber, ion-recombination losses are observed not to exceed 0.05%. Prior art well-type ion chambers show recombination losses of the order of 1% or larger under these conditions, with the size of the error depending on the source strength at the time of its measurement.

The ionization electrode is supported on a unique "pancake" arrangement of insulators and electrodes that are located at the bottom of the chamber. The triaxial electrometer cable enters laterally, then bends upward along the chamber's midline axis. The central conductor of the cable connects the ionization electrode to the high-impedance electrometer input, which is biased typically 300 V positive or negative from ground. The intermediate conductor of the cable connects the guard plate to the low-impedance electrometer input, which is biased at the same potential as the central conductor. The outer conductor of the cable connects the remainder of the metal parts of the ion chamber to the grounded case of the electrometer; thus the outside surface of the ion chamber is at ground potential and poses no electrical hazard.

The two insulating discs are made of polycarbonate high-impact plastic for ruggedness. The upper insulating disc, which separates the bottom plate of the collecting electrode from the guard plate, is coated with an electrical conductor such as evaporated aluminum or graphite in isopropyl alcohol, except in the groove around its edge, and in the countersunk holes for the machine screws that fasten it to the guard plate. This conducting coating prevents accumulation of charge on the surface of that insulator, which would cause unstable radiation response. The groove around the disc edge sharply delimits and defines the air volume from which ionization is collected and measured, thereby also contributing to the operational stability of the ion chamber.

The guard plate prevents any electrical insulator leakage current that could, in the absence of such an electrode, pass between the ionization electrode and ground. Because the guard plate is at the same potential as the ionization electrode, no current passes from one to the other. Any leakage of current across the lower insulating plate between the guard plate and ground will not be detected. Hence in this design any electrical leakage current is prevented from causing an error in the ionization measurement.

Further objects, features and advantages of the invention will be apparent from the following detailed description when taken in conjunction with the accompanying drawings.

DETAILED DESCRIPTION OF THE INVENTION

Figure 1:
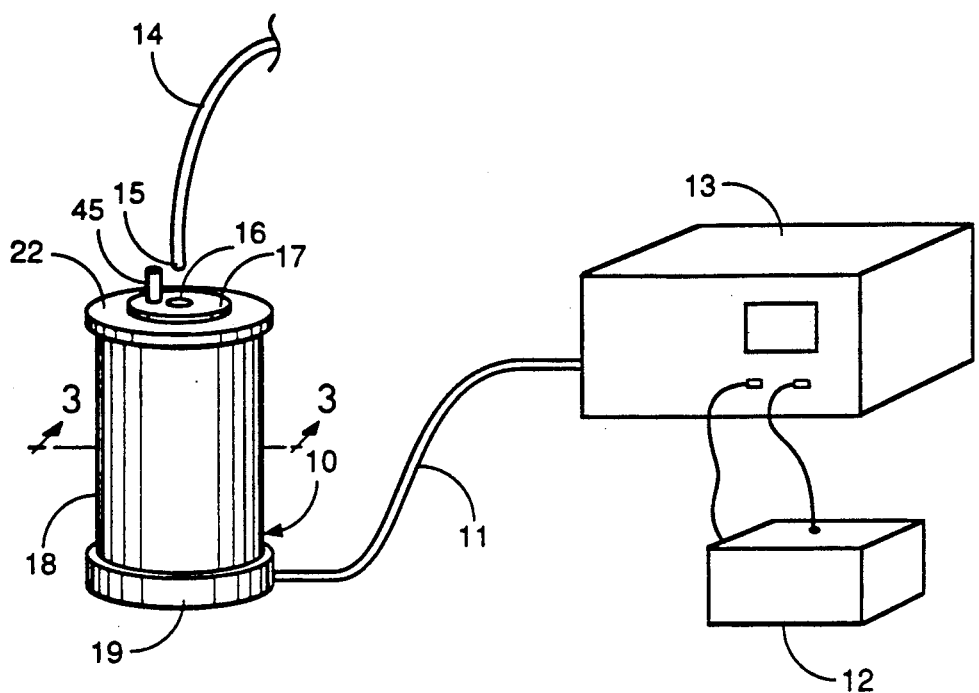
FIG. 1 is an illustrative perspective view of the ionization chamber radiation detector of the present invention connected to an electrometer and voltage source, and positioned to receive a catheter which will guide a radioactive source to its measurement location in the ion chamber.

With reference to the drawings, an ionization chamber radiation detector of the present invention is shown generally at 10 in FIG. 1, connected by a triaxial electrical cable 11 to an electrometer 13 and high voltage supply 12. It is a particular advantage of the present invention that it may be utilized with electrometers commonly available and used for calibration in clinical settings, such as the Keithly Model 602 electrometer and comparable products. The ionization chamber device 10 is shown in FIG. 1 in position to receive a catheter 14, which will later guide a concentrated radioactive source to its measurement position within the ion chamber. The tip is inserted into an opening 16 in a top cap 17 so that the catheter can be inserted into the ionization chamber detector 10. As shown in FIG. 1, the detector 10 has an outer shell 18 which includes a base section 19 from which the electrical cable 11 extends. FIG. 1 illustrates the insertion of the catheter 14 into the device, which is usually carried out by an operator who inserts the catheter into the opening 16 and continues to push it in until the tip 15 reaches a stop, usually located at the bottom of the well. The radioactive source can then be driven by its attached wire through the catheter to the preferred location where it produces maximum ionization in the ion chamber's sensitive volume. The electrometer 13 and voltage supply 12 can then be used to measure the resulting ionization current.

Figure 3:
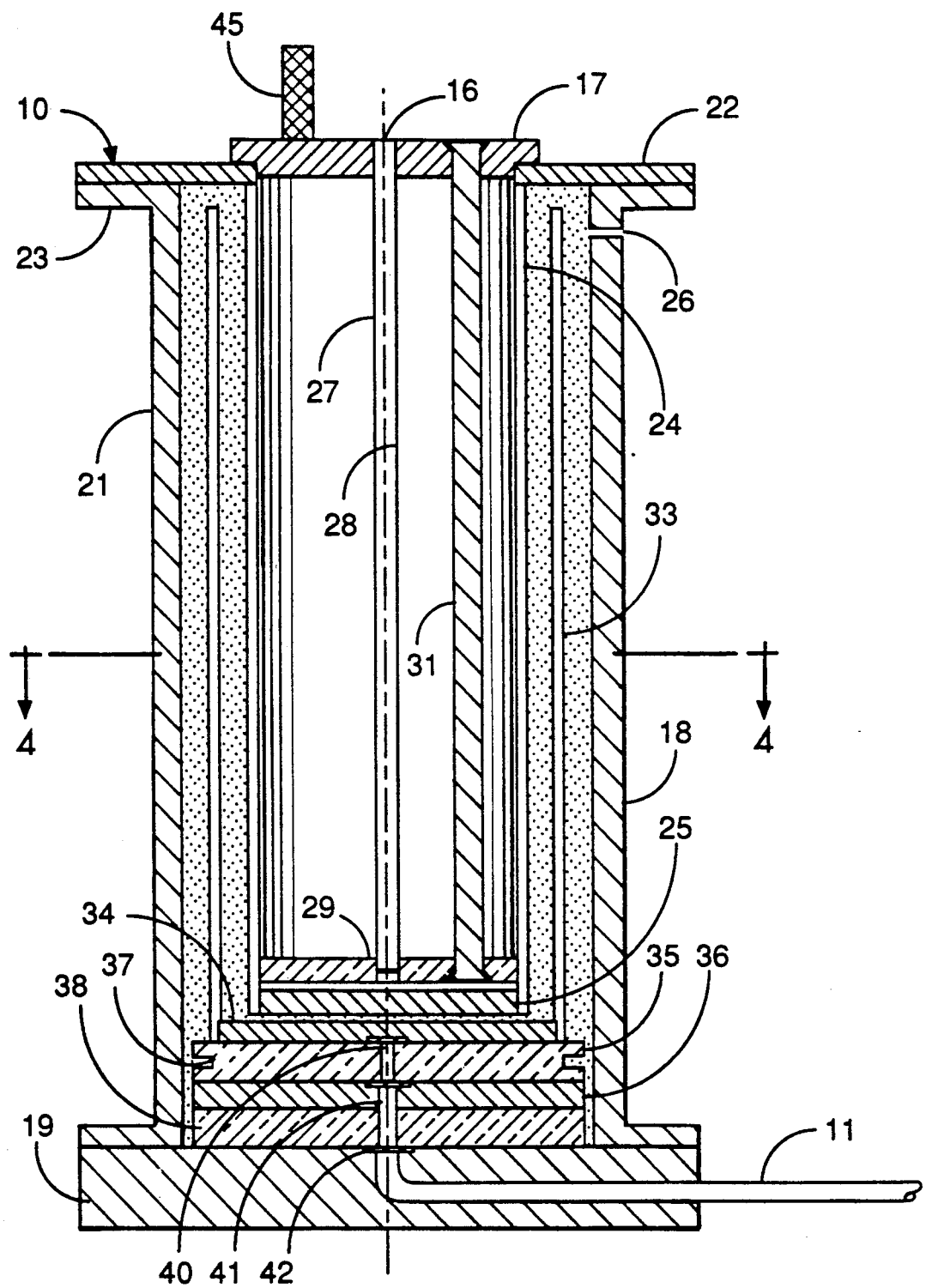
FIG. 3 is a cross-section taken along the lines 3—3 and generally through the center of the ionization chamber device of FIG. 1.

A cross-section through the central axis of the device 10, taken generally along the lines 3—3 of FIG. 1, is shown in FIG. 3. As illustrated in this view, the outer shell 18 of the device 10 has a cylindrical side wall 21 and a top plate 22 which is mounted to an outwardly extending flange 23 of the side wall 21 to partially close the top of the outer shell. The base 19 is mounted to the bottom of the side wall 21 to close the bottom of the shell. The interior of the shell is then fully closed by the cap 17 which fits onto the top plate 22. Within the outer shell is an inner well which is formed of a cylindrical side wall 24 and a flat bottom wall 25. The top end of the cylindrical wall 24 of the well is attached to and electrically connected to the top plate 22, which is in turn electrically connected to the side wall 21 and thereby to the base 19. Each of these components is preferably formed of a good conducting metal, such as aluminum, or brass for the base 19, with all meeting parts tightly joined together so there is good electrical contact between all surfaces. The base is preferably made of a higher-density metal, such as brass or stainless steel, than the other metal parts, to lower the center of gravity and thus increase the tipping stability of the ion chamber. Similarly, the top cap 17 is preferably formed of a conductive metal such as aluminum and is in contact with the top panel 22 to be electrically connected thereto. The space between the walls 24 and 25 of the well and the shell 18 define the sensitive volume of the ionization chamber detector. This volume is in communication with the external atmosphere through an opening 26 formed in the side wall 21 to assure that the air inside remains at the same pressure as the surrounding atmosphere. Measurements of temperature and pressure by suitable instruments located in the same room as the ion chamber thus can be used to determine its internal air density, to which the ion chamber's radiation sensitivity is proportionally related.

Figure 5:
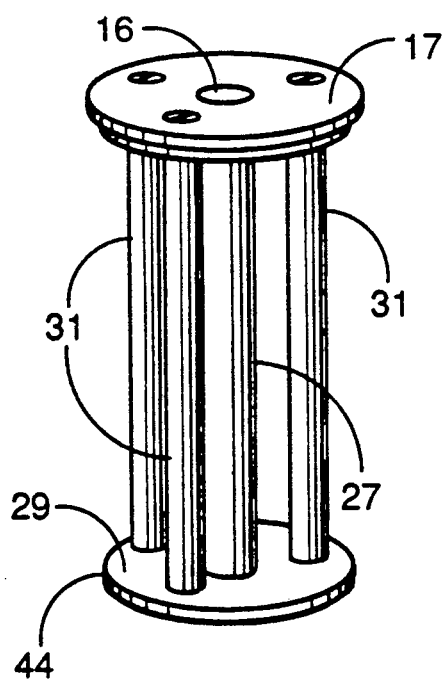
FIG. 5 is a perspective view of the sample positioner portion of the radiation detector device of the invention.

The top cap 17 forms part of a sample positioner which includes a guide tube 27 which is attached to the top cap 17 and which has an interior bore 28. The guide tube extends downwardly from the top cap to attachment to a flat spacing disc 29. Three symmetrically-positioned support posts 31 are attached to the top cap 17 and extend downwardly parallel to the tube 27 to attach to the spacing disc 29. The tube 27 and the support posts 31 are formed of the same kind of metal, preferably aluminum, to assure that they will have the same thermal expansion coefficient, thus preventing possible bowing distortion of tube 27. The spacing disc 29 is preferably formed of a low-friction plastic such as polytetrafluoroethylene, or of aluminum surrounded by a flexible O-ring held in a groove around the edge of the disc. The posts 31 serve to provide a structurally rigid mounting of the disc 29 to the guide tube 27. As best shown in FIG. 5, the spacing disc has an outer periphery 44 which, for the device of FIG. 3, has a circular shape to match the circular cross-section of the cylindrical interior of the well side wall 24. The positioner can be removed from the well by the operator by grasping a knurled post 45 attached to the cap and drawing the cap 17 upwardly, and the positioner can be replaced into the well by inserting the end disc 29 into the well where its outer periphery closely engages the interior bore of the side wall 24. When the positioner is fully inserted into the well, the engagement between the spacing disc periphery 29 and the interior wall of the well positively locates the guide tube 27 in the center of the well at the bottom end of the guide tube, and the guide tube 27 is properly located at its top end as the cap 17 fits into its mating opening in the top plate 22 of the shell.

Within the ionization chamber sensitive volume defined between the outer shell 18 and the walls 24 and 25 of the well is mounted an ionization electrode which has a cylindrical side wall 33 and a flat disc-shaped bottom wall 34. The side wall 33 of the electrode is mounted coaxially with and spaced intermediate the side wall 24 of the well and the side wall 21 of the shell. The walls 33 and 34 of the electrode are again formed of a good conducting metal, preferably aluminum. The ionization electrode is mounted on a base insulator structure which is composed of an insulator disc 35, an intermediate guard electrode 36 and a second insulator disc 38 which rests on the base 19 of the shell. The lower insulating disc 38 may be fastened to the base plate 19 by machine screws (not shown) countersunk into the upper plastic surface to avoid electrical contact with the guard electrode 36, which in turn may be fastened to the lower insulating disc 38 by machine screws (not shown) engaging tapped blind holes in the lower insulating disc. In turn, the upper insulating disc 35 may be fastened to the guard electrode 36 by machine screws (not shown) countersunk into the upper plastic surface of the disc to avoid electrical contact with the ionization electrode base plate 34, which itself may be fastened to the upper insulating disc by machine screws (not shown) engaging tapped blind holes in the upper insulating disc. The screw holes are all staggered in location so as not to interfere with each other. The insulators 35 and 38 may be formed of conventional plastic insulator materials, preferably polycarbonate, which not only provides good electrical insulating characteristics but also is mechanically stable and durable against rough handling. The intermediate guard electrode 36 is maintained at an electrical potential identical to that of the ionization electrode so that leakage current passing through the insulator 35 does not reach the surrounding shell and thereby affect the measured current between the shell and ionization electrode. The "pancake" design of the base insulator structure is physically robust (particularly with the use of high impact polycarbonate insulators 35 and 38) to maintain constant chamber calibration despite rough handling. The upper polycarbonate insulator 35 preferably has a conductive (e.g., colloidal graphite or evaporated aluminum) coating except for screw holes and an insulating groove 37 around its edge to avoid electrical instability due to charge build-up on its surface. A suitable graphite in isopropyl alcohol conductive coating is available commercially as Acheson Aerodag G. The conductive coating also helps clearly define the lower limiting edge of the sensitive volume of the ionization chamber. Ionization occurring just above the groove gets collected on the upper conductive coating (which is in contact with the ionization electrode) and is thus measured. Ionization occurring below the groove goes to the guard electrode and is thus not measured.

Figure 2:
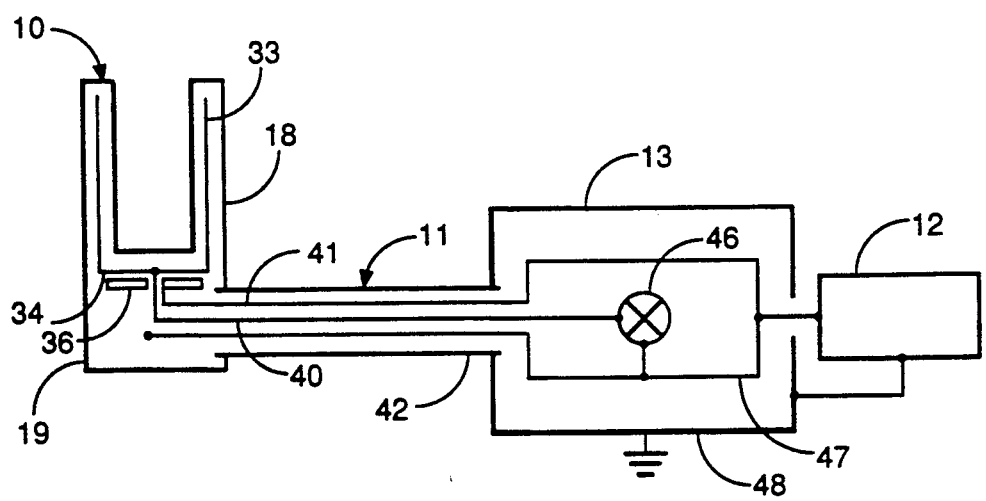
FIG. 2 shows the electrical connections between the ion chamber, the triaxial cable, the electrometer and the voltage supply that biases the ionization electrode in the ion chamber.

As illustrated in FIGS. 1 and 2, a preferred manner of electrically connecting the electrometer to the ionization electrode, the intermediate electrode 36 and the shell 18 is by the utilization of a triaxial conductor 11 which has three conductors arranged coaxially with insulation between them. The central conductor 40, connected to a high-impedance electrometer input 46 at one end, extends through the insulator 35 and makes electrical connection to the bottom disc 34 of the ionization electrode at the other end. The second or intermediate conductor 41, connected to a low-impedance electrometer input 47 at one end, extends through the insulator 38 and makes electrical contact with the intermediate guard electrode 36 at the other end. The outermost conductor 42, connected to the grounded case 48 of the electrometer 13, is in electrical contact with the base 19 to provide grounding of the base and all of the remaining portions of the shell and the interior well which are in electrical continuity therewith. The intermediate guard electrode 36 is maintained at a voltage level identical to that of the ionization electrode but is not connected to the current measuring circuity of the electrometer so that current flowing to it is not measured by the electrometer as part of the ionization current. The ionization current occurs as the air within the chamber defined between the walls 24 and 25 of the well and the surrounding walls of the shell is ionized by radiation emanating from a source held within the guide tube 27. The positively and negatively ionized air molecules migrate in opposite directions between the ionization electrode and the grounded structure to provide the ionization current.

Figure 4:
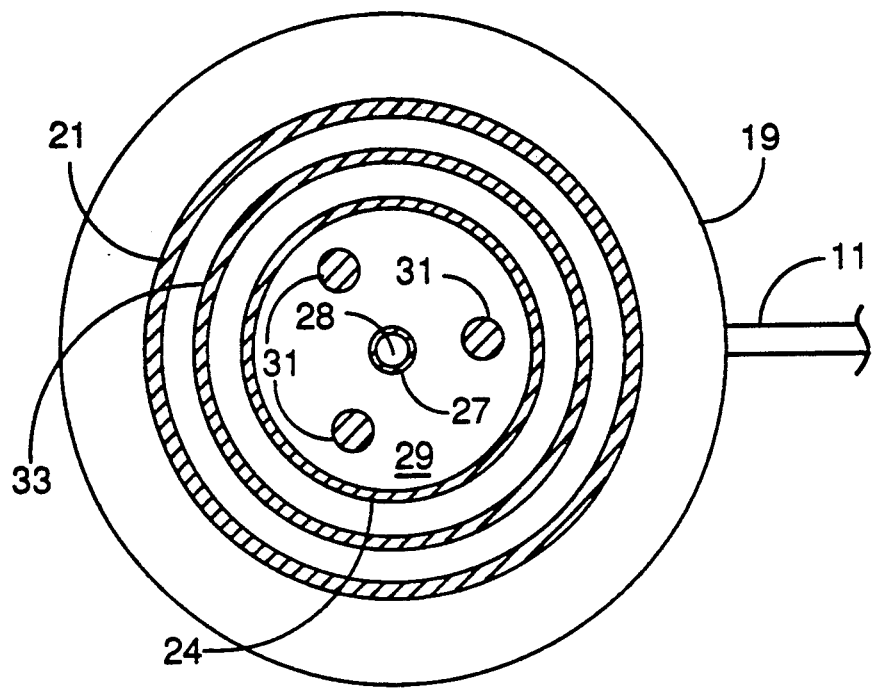
FIG. 4 is a cross-sectional view through the ionization chamber device taken generally along the lines 4—4 of FIG. 3.

The arrangement of the ionization detector 10 shown in FIGS. 3 and 4 in which the side wall of the well, the ionization electrode side wall, and the shell side wall are all cylindrical and concentric provides a preferred structure in which there are substantially no sharp corners which affect radial uniformity of the electric field. Thus, radiation from a source positioned at the central axis of the concentric cylinder walls will result in radially uniform ionization and similarly radially uniform ionization current between the electrode and the grounded elements.

Figure 6:
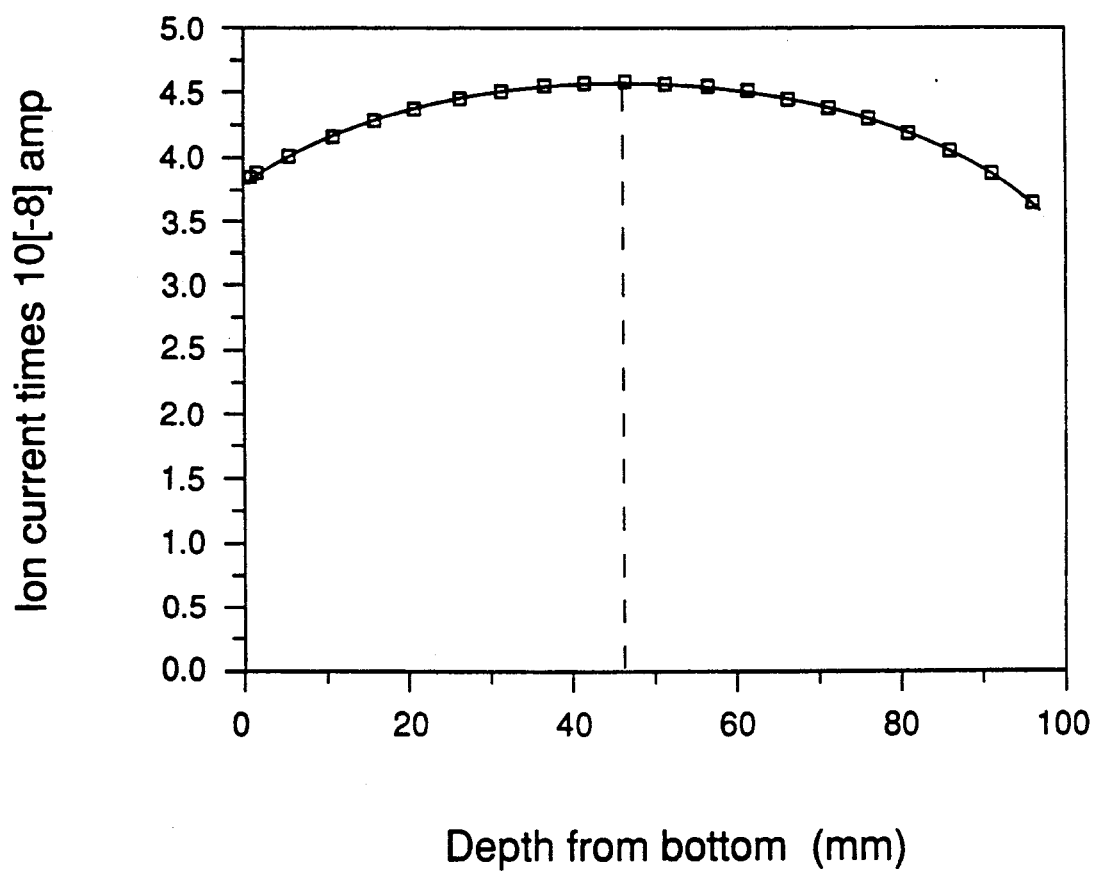
FIG. 6 is a graph showing the relationship for the device of the present invention of ionization current versus distance of the source from the bottom of the well as the source is inserted into the guide tube.

An exemplary well-type ionization chamber detector was constructed having an overall external height of 17.5 cm, with an inner well 3.6 cm in diameter and 12.1 cm deep. The walls of the shell were formed of aluminum 75/1000 inch (1.9 mm) in thickness, with aluminum side walls for the well and the ionization electrode which were 35/1000 inch (0.89 mm) in thickness and an aluminum guide tube having 0.125 inch (3.18 mm) outside diameter by 20/1000 inch (0.51 mm) wall thickness and 4.734 inches (12 cm) length. The side wall of the well was 1.5 inches (3.81 cm) outside diameter and the side wall of the ionization electrode was 2 inches (5.08 cm) outside diameter. Ionic recombination in this ionization chamber was observed to be 0.04% with 300 volts applied and a 6.5 Ci $^{192}$Ir source at the center of the guide tube. The current collected was about $7 \times 10^{-9}$ A/Ci. FIG. 6 shows a plot of ion current versus source distance from the bottom of the well for this exemplary ionization chamber. The maximum ion current is at 4.6 cm from the bottom, with a decrease of 0.1-0.2% as the source is moved up or down by 5 mm. Thus, the source calibration position is not critical, and readings are readily reproducible. Ten consecutive readings of current, obtained by removing the source sample from the detector, replacing it in its shield and then returning it to the detector, gave a standard deviation of only 0.01%. Placing the ionization chamber detector 10 on the floor versus on a table had no effect on the readings, demonstrating insensitivity to scattered photons from outside the chamber. Observed background current, absent the radioactive source, was less than $10^{-14}$ A.

The ionization chamber detector can be calibrated by means of a $^{192}$Ir source which itself has been calibrated independently. Radiation sensitivity can be verified by means of a $^{90}$Sr-$^{90}$Y ophthalmic applicator (having a half-life of 28.1 years) which is reproducibly positioned at the top of the 3.6 cm diameter well remaining when the sample positioning guide tube is removed from the well. Ionization currents on the order of $10^{-9}$ A are generated by the beta rays from such a source. It is a particular advantage of the present invention that by removing the sample positioner, the relatively large well volume is available for placement or insertion of a large-diameter (e.g., $\frac{1}{2}$ inch) radioactive source to check for any changes in radiation sensitivity. The inner walls of the well are preferably thin enough to pass beta rays.

It is understood that the invention is not confined to the particular embodiments set forth herein as illustrative, but embraces such modified forms thereof as come within the scope of the following claims.

What is claimed is:

1. A well-type ionization chamber radiation detector device comprising:
   (a) an outer shell of conductive material;
   (b) walls forming an inner well disposed within and electrically connected to the outer shell, wherein an ionization chamber sensitive volume is defined between the inner well and the outer shell;
   (c) an ionization electrode within the ionization chamber volume and substantially surrounding the well;

(d) insulator means for mounting the ionization electrode within the outer shell and electrically insulating the ionization electrode from the outer shell and the inner well;

(e) electrical conductors connected to the shell and well to allow a ground potential to be provided thereto and electrical conductors connected to the ionization electrode to allow a high voltage to be provided thereto; and (f) means for positioning a radiation source sample at a selected central position within the well including a thin wall guide tube with an interior bore, a top cap to which the thin wall guide tube is mounted at its top end, the cap having an opening therein which communicates with the bore of the guide tube, and spacing means mounted to the guide tube to engage the wall of the well to hold the guide tube in proper position in the well.

2. The device of claim 1 wherein the well is suspended from a top portion of the shell and the well has a bottom which is spaced upwardly from a bottom portion of the ionization electrode.

3. The device of claim 1 wherein the shell, the ionization electrode, and the well have cylindrical side walls which are concentrically mounted with respect to one another.

4. The device of claim 1 wherein the shell has a base portion, and wherein the insulator means includes a base insulator mounted on the base portion of the shell within the interior of the shell, a bottom portion of the ionization electrode mounted on the base insulator with a side wall of the ionization electrode extending vertically upwardly from the bottom portion of the ionization electrode.

5. The device of claim 1 wherein the spacing means includes a disc mounted to the bottom of the tube with an outer periphery shaped to correspond to the inner periphery of the wall of the well, wherein the cap of the positioning means is adapted to close the top of the well, and wherein a catheter to guide a radiation source can be inserted into the opening in the cap into the interior bore of the tube to precisely locate the radiation source in the well within the guide tube.

6. The device of claim 1 including an opening in the outer shell to provide communication between the ionization chamber sensitive volume and the ambient atmosphere.

7. A well-type ionization chamber radiation detector device comprising:

(a) an outer shell of conductive material having a base portion;

(b) walls forming an inner well disposed within and electrically connected to the outer shell, wherein an ionization chamber sensitive volume is defined between the inner well and the outer shell;

(c) an ionization electrode within the ionization chamber volume and substantially surrounding the well;

(d) insulator means for mounting the ionization electrode within the outer shell and electrically insulating the ionization electrode from the outer shell and the inner well including a base insulator mounted on the base portion of the shell within the interior of the shell, a bottom portion of the ionization electrode mounted on the base insulator with a side wall of the ionization electrode extending vertically upwardly from the bottom portion of the ionization electrode;

(e) electrical conductors connected to the shell and well to allow a ground potential to be provided thereto and electrical conductors connected to the ionization electrode to allow a high voltage to be provided thereto; and (f) means for positioning a radiation source sample at a selected central position within the well;

wherein the base insulator includes two insulator discs and a conductive guard electrode mounted between the two insulator discs of the base insulator, with one insulator disc mounted on the base portion of the shell and the other insulator disc in contact with the ionization electrode, and further including an electrical conductor connected to the guard electrode to allow a high voltage to be provide thereto.

8. The device of claim 7 including means for biasing the guard electrode to the same potential as the ionization electrode to eliminate leakage current between the two electrodes.

9. The device of claim 7 wherein the electrical conductors connected to the ionization electrode, the guard electrode and the shell are connected to a triaxial cable having three conductors separated by insulation, the triaxial cable extending into the base portion of the shell to make connection of one of its conductors to the base portion of the shell, another of its conductors to the guard electrode and with the third conductor to the ionization electrode.

10. The device of claim 7 wherein the insulating discs are made of polycarbonate plastic.

11. A well-type ionization chamber radiation detector device comprising:

(a) an outer shell of conductive material having a base, a cylindrical side wall extending from the base, and a top panel joined to the top of the cylindrical side wall;

(b) walls forming an inner well mounted within the outer shell, the inner well having a cylindrical side wall concentric with the cylindrical side wall of the outer shell and a bottom wall which closes the bottom of the well, the walls of the inner well formed of electrically conductive material and being electrically connected to the outer shell, the inner well and outer shell defining between them an ionization chamber sensitive volume;

(c) an ionization electrode including a bottom portion and a cylindrical side wall extending upwardly therefrom, the cylindrical side wall positioned in the space between the side wall of the well and the side wall of the shell and concentric therewith, the ionization electrode formed of electrically conductive material;

(d) insulator means for mounting the ionization electrode within the shell and electrically insulating the ionization electrode from the inner well and the outer shell;

(e) an electrical conductor electrically connected to the shell to allow a ground potential to be provided to the shell and well, and an electrical connector connected to the ionization electrode to allow a high voltage to be provided to the electrode; and (f) means for positioning a sample at the center of the well in a selected position within the well.

12. The device of claim 11 wherein the side wall of the well is connected to the top panel of the shell and is suspended therefrom, such that the bottom wall of the well is suspended above the bottom portion of the ionization electrode.

13. The device of claim 11 wherein the sample positioning means includes a thin walled guide tube with an interior bore, a top cover to which the thin walled guide tube is mounted at one end, the cover having an opening therein which opens into the interior bore of the guide tube, and spacing means mounted to the guide tube for engaging the interior of the side wall of the well to hold the guide tube in proper position within the well.

14. The device of claim 13 wherein the spacing means includes a disc mounted to the bottom of the guide tube which has a circular outer periphery shaped and sized to fit closely within the cylindrical inner periphery of the side wall of the well, wherein the opening in the cap allows a catheter for guiding a radioactive source sample therein to be inserted through the opening in the cap into the interior of the guide tube and to be positioned so that the source will be in the center of the well in a desired position.

15. The device of claim 11 wherein the walls forming the well and the ionization electrode are formed of aluminum.

16. The device of claim 11 wherein the spacing between the ionization electrode and the wall of the well is equal to that between the ionization electrode and the outer shell, and wherein the spacing is such that a potential of 300 V is sufficient to reduce the level of ionic recombination to less than 0.05%, while producing an ionization current of 70 nanoamperes when an IR-192 source of 10 Ci is placed in the chamber.

17. The device of claim 11 including an opening in the outer shell to provide communication between the ionization chamber volume and the ambient atmosphere.

18. The device of claim 11 wherein the shell has a base portion, and wherein the insulator means includes a base insulator mounted on the base portion of the shell within the shell, the bottom portion of the ionization electrode mounted on the base insulator with the side wall of the ionization electrode extending vertically upwardly therefrom between the side wall of the well and the side wall of the shell.

19. The device of claim 18 wherein the base insulator includes two insulator discs and a conductive guard electrode mounted between the two insulator discs, one insulator disc mounted to the base of the shell and the other insulator disc supporting the bottom of the ionization electrode, and an electrical conductor electrically connected to the guard electrode to allow a high voltage to be applied thereto.

20. The device of claim 19 wherein the electrical conductors connected to the shell, to the ionization electrode and to the guard electrode are connected to a triaxial cable having three conductors separated by insulation and wherein the outermost conductor is connected to the base portion of the shell to provide a ground potential thereto, the intermediate conductor is connected to the guard electrode to provide a high voltage thereto and the innermost conductor is connected to the ionization electrode to provide a high voltage thereto.

21. A well-type ionization chamber radiation detector device comprising:
(a) an outer shell of conductive material enclosing an interior volume;
(b) walls forming an inner well mounted within the outer shell;
(c) an ionization electrode mounted within the outer shell between the inner well and the outer shell and electrically insulated therefrom;
(d) means for providing electrical connection to the outer shell and a separate electrical connection to the ionization electrode;
(e) a sample positioner comprising a guide tube having an interior bore, a top cover to which the guide tube is connected at one end, the top cover having an opening therein which extends through the cover into communication with the interior of the guide tube, and a spacing disc mounted to the guide tube and having an outer periphery conforming to the inner periphery of the well such that the sample positioner can be inserted into the well and will engage the wall of the well to hold the guide tube in a predetermined position within the well, whereby a radiation source sample in a catheter can be inserted into the opening in the top cover and thence into the guide tube to be extended down into the guide tube to a selected position therein with respect to the walls of the well, the ionization electrode and the shell.

22. The device of claim 21 wherein the sample positioner further includes a post connected to the top cover at one of its ends and to the spacing disc at the other of its ends at a position spaced from the guide tube.

23. The device of claim 21 wherein the well has a cylindrical side wall, the ionization electrode has a cylindrical wall concentric with and spaced outwardly from the side wall of the well, and the shell has a cylindrical side wall spaced outwardly from and concentric with the ionization electrode, and wherein the disc of the sample positioner has a circular outer periphery sized to fit closely within the cylindrical interior of the well and to position the guide tube at the center of the well.

24. The device of claim 23 wherein the guide tube, and the cylindrical side walls of the well, the ionization electrode and the shell are formed of aluminum.

25. A well-type ionization chamber radiation detector device comprising:
(a) an outer shell of conductive material including a base portion;
(b) walls forming an inner well disposed within and electrically connected to the outer shell, wherein an ionization chamber sensitive volume is defined between the inner well and the outer shell;
(c) an ionization electrode within the ionization chamber volume and having a sidewall substantially surrounding the well;
(d) a base insulator mounted on the base portion of the shell within the interior of the shell, a bottom portion of the ionization electrode mounted on the base insulator with the side wall of the ionization electrode extending vertically upwardly from the bottom portion of the ionization electrode, wherein the base insulator includes two insulator discs and a conductive guard electrode mounted between the two insulator discs of the base insulator, with one insulator disc mounted on the base of the shell and the other insulator disc in contact with the ionization electrode; and
(e) means for providing a ground potential to the shell and well and means for providing a high voltage to the ionization electrode and the guard electrode.

26. The device of claim 25 wherein the well is suspended from a top portion of the shell and the well has a bottom which is spaced upwardly from a bottom portion of the ionization electrode.

27. The device of claim 25 wherein the shell, the ionization electrode, and the well have cylindrical side walls which are concentrically mounted with respect to one another.

28. The device of claim 25 wherein the means for providing ground potential and high voltage includes electrical conductors connected to the ionization electrode, the guard electrode and the shell which are connected to a triaxial cable having three conductors separated by insulation, the triaxial cable extending into the base portion of the shell to make connection of one of its conductors to the base portion of the shell, another of its conductors to the guard electrode and the third of its conductors to the ionization electrode.

29. The device of claim 25 wherein the insulator discs are made of polycarbonate plastic.

30. The device of claim 25 wherein the insulator disc in contact with the ionization electrode has a groove extending around its peripheral edge and a conductive coating on the surface of the insulator disc except in the groove, thereby to avoid electrical instability due to accumulation of surface charge on the disc and to define the limit of the lower boundary of the sensitive volume of the ion chamber.

* * * * *